US009779492B1

(12) United States Patent
Garnavi et al.

(10) Patent No.: US 9,779,492 B1
(45) Date of Patent: Oct. 3, 2017

(54) RETINAL IMAGE QUALITY ASSESSMENT, ERROR IDENTIFICATION AND AUTOMATIC QUALITY CORRECTION

(71) Applicant: International Business Machines Corporation, Armonk, NY (US)

(72) Inventors: Rahil Garnavi, Macleod (AU); Dwarikanath Mahapatra, Melbourne (AU); Pallab K. Roy, Melbourne (AU); Suman Sedai, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/070,699

(22) Filed: Mar. 15, 2016

(51) Int. Cl.
*G06K 9/62* (2006.01)
*G06T 7/00* (2017.01)
*G06K 9/66* (2006.01)

(52) U.S. Cl.
CPC .......... *G06T 7/0002* (2013.01); *G06K 9/6267* (2013.01); *G06K 9/66* (2013.01); *G06T 2207/30168* (2013.01)

(58) Field of Classification Search
CPC ........ G06T 7/0002; G06T 2207/30168; G06K 9/6267; G06K 9/66
See application file for complete search history.

(56) References Cited

U.S. PATENT DOCUMENTS

| 5,993,001 | A | 11/1999 | Bursell et al. |
| 7,303,280 | B2 | 12/2007 | Olivier et al. |
| 8,494,283 | B2 | 7/2013 | Joshi et al. |
| 8,712,157 | B2 | 4/2014 | Marchesotti et al. |
| 8,787,638 | B2 | 7/2014 | Zee et al. |
| 8,879,813 | B1 * | 11/2014 | Solanki ................. G06T 7/0014 382/128 |
| 9,064,304 | B2 | 6/2015 | Kenny et al. |
| 2013/0172735 | A1 | 7/2013 | Andre et al. |
| 2015/0104087 | A1 | 4/2015 | Katuwal et al. |

(Continued)

FOREIGN PATENT DOCUMENTS

WO    WO2013081619 A1    6/2013

OTHER PUBLICATIONS

Breiman, L., "Random forests", Machine Learning, Oct. 2001, pp. 5-32, vol. 45, Issue 1.

(Continued)

*Primary Examiner* — Phuoc Tran
(74) *Attorney, Agent, or Firm* — Scully, Scott, Murphy & Presser, P.C.; Louis J. Percello, Esq.

(57) ABSTRACT

Automatically determining image quality of a machine generated image may generate a local saliency map of the image to obtain a set of unsupervised features. The image is run through a trained convolutional neural network (CNN) to extract a set of supervised features from a fully connected layer of the CNN, the image convolved with a set of learned kernels from the CNN to obtain a complementary set of supervised features. The set of unsupervised features and the complementary set of supervised features are combined, and a first decision on gradability of the image is predicted. A second decision on gradability of the image is predicted based on the set of supervised features. Whether the image is gradable is determined based on a weighted combination of the first decision and the second decision.

20 Claims, 16 Drawing Sheets

(56) References Cited

U.S. PATENT DOCUMENTS

2016/0358035 A1* 12/2016 Ruan .................. G06K 9/4676
2017/0132497 A1* 5/2017 Santos ................. G06K 9/66

OTHER PUBLICATIONS

Davis, H., et al., "Vision-based, Real-time Retinal Image Quality Assessment", 22nd IEEE International Symposium on Computer-Based Medical Systems, Aug. 2-5, 2009, pp. 1-6.

Giancardo, L., et al., "Quality Assessment of Retinal Fundus Images using Elliptical Local Vessel Density" New Developments in Biomedical Engineering, Jan. 2010, pp. 202-224.

Goldstein, E.B., "Sensation and Perception", 2010, 490 pages, Eighth Edition, Wadsworth Cengage Learning, Belmont, CA.

Harel, et al., "Graph-Based Visual Saliency", Advances in Neural information Processing Systems (NIPS), 2006, pp. 397-904.

Hou, X., et al., "Image Signature: Highlighting sparse salient regions", IEEE Transations on Pattern Analysis and Machine Intelligence, Jan. 2012, pp. 194-201, vol. 34, Issue 1.

Hunter, A., et al., "An Automated Retinal Image Quality Grading Algorithm", 33rd Annual International Conference of the IEEE EMBS, Aug. 30-Sep. 3, 2011, pp. 5955-5958.

Itti, L., et al., "A Model of Saliency-Based Visual Attention for Rapid Scene Analysis" IEEE Transactions on Pattern Analysis and Machine Intelligence, Nov. 1998, pp. 1254-1259, vol. 20, No. 11.

Kohler, T., et al., "Automatic No-Reference Quality Assessment for Retinal Fundus Images Using Vessel Segmentation", IEEE 26th International Symposium on Computer-Based Medical Systems (CBMS), Jun. 20-22, 2013, pp. 95-100.

Krizhevsky, A., et al., "Imagenet Classification with Deep Convolutional Neural Networks", Advances in Neural Information Processing Systems (NIPS), Jan. 2012, pp. 1106-1114, vol. 25, No. 2.

Lalonde, M., et al., "Automatic visual quality assessment in optical fundus images", Proceedings of Vision Interface, Jun. 7-9, 2001, pp. 259-264.

Lee, S., et al., "Automatic retinal image quality assessment and enhancement", SPIE Conference on Image Processing, Feb. 1999, pp. 1581-1590.

Lowell, J., "Automated retinal analysis", Durham theses, Durham University, Jun. 1, 2006, 175 pages.

Pires Dias, J.M., et al., "Retinal image quality assessment using generic image quality indicators" Information Fusion, Sep. 2014, pp. 73-90, vol. 19.

Nair, V., et al., "Rectified Linear Units Improve Restricted Boltzmann Machines", Proceedings of the 27th International conference on Machine Learning, Jun. 21-24, 2010, pp. 807-814.

Niemeijer, M., et al., "Image structure clustering for image quality verification of color retina images in diabetic retinopathy screening", Medical Image Analysis, Dec. 2006, pp. 888-898, vol. 10, Issue 6.

Olshausen, B.A., et al., "A Neurobiological Model of Visual Attention and Invariant Pattern Recognition Based on Dynamic Routing of Information," The Journal of Neuroscience, Nov. 1993, pp. 4700-4719, vol. 13, No. 11.

Paulus, J., et al., "Automated Quality Assessment of Retinal Fundus Photos", International Journal of Computer Assisted Radiology and Surgery, Nov. 2010, pp. 557-564, vol. 5, Issue 6.

Sivaswamy, J., et al., "A Comprehensive Retinal Image Dataset for the Assessment of Glaucoma from the Optic Nerve Head Analysis" JSM Biomedical Imaging Data Papers 2(1), Mar. 2015, pp. 1004-1010.

Usher, D., et al., "Automated assessment of digital fundus image quality using detected vessel area" Medical Image Understanding and Analysis 2003, Proceedings of the Seventh Annual Conference, The University of Sheffield, Jul. 10-11, 2003, pp. 81-84.

Burgess, P., et al., "Diabetic retinopathy in sub-Saharan Africa: meeting the challenges of an emerging epidemic", BMC Medicine, Jul. 2, 2013, pp. 1-7, vol. 11, No. 157.

Martinez Perez, G., et al., "Barries to pilot mobile teleophtalmology in a rural hospital in Southern Malawi", Pan African Medical Journal, Sep. 2014, vol. 19, No. 136.

* cited by examiner

RETINAL IMAGE QUALITY ASSESSMENT, ERROR IDENTIFICATION AND AUTOMATIC QUALITY CORRECTION

FIELD

The present application relates generally to computers and computer imaging, and more particularly to automatic image quality assessment and correction.

BACKGROUND

Retinal image quality assessment (IQA) is a step in screening systems for diseases like diabetic retinopathy (DR), glaucoma and age related macular degeneration (AMD) which require rapid and accurate evaluation. For example, color funds retinal image assessment is used to diagnose such diseases. Digital fundus photography of the retina is an effective non-invasive examination medium of many retinal conditions with the potential to reduce workload of ophthalmologists and increase the cost effectiveness of screening systems. Medical image quality assessment has not be much explored since many studies report a significant percentage of acquired study images to be of insufficient quality for an automated assessment. Poor quality images have to be discarded. Existing approaches to IQA use hand crafted features which are not inclusive and do not generalize well to new datasets. Neither do they leverage the functioning of the human visual system (HVS) to improve IQA algorithms.

BRIEF SUMMARY

A computer-implemented method and system of determining image quality may be provided. The method, in one aspect, may include receiving an image generated by a machine. The method may also include generating a local saliency map of the image to obtain a set of unsupervised features using unsupervised learning. The method may further include inputting the image through a trained convolutional neural network (CNN) to extract a set of supervised features from a fully connected layer of the CNN using supervised learning, the image convolved with a set of learned kernels from the CNN to obtain a complementary set of supervised features. The method may also include combining the set of unsupervised features, the set of supervised features and the complementary set of supervised features. The method may further include predicting a first decision on gradability of the image with a first confidence score, by training a first classifier based on a combined set of unsupervised features, the set of supervised features and the complementary set of supervised features. The method may also include predicting a second decision on gradability of the image with a second confidence score, by training a second classifier based on the set of supervised features. The method may further include determining whether the image is gradable or ungradable based on a weighted combination of the first decision and the second decision, the first confidence score and the second confidence score representing respective weights for the first decision and the second decision.

A system of determining image quality, in one aspect, may include one or more of hardware processors operable to receive an image generated by a machine. One or more of the hardware processors may be further operable to generate a local saliency map of the image to obtain a set of unsupervised features using unsupervised learning. One or more of the hardware processors may be further operable to input the image through a trained convolutional neural network (CNN) to extract a set of supervised features from a fully connected layer of the CNN using supervised learning, the image convolved with a set of learned kernels from the CNN to obtain a complementary set of supervised features. One or more of the hardware processors may be further operable to combine the set of unsupervised features and the complementary set of supervised features. One or more of the hardware processors may be further operable to predict a first decision on gradability of the image with a first confidence score, by training a first classifier based on a combined set of unsupervised features and the complementary set of supervised features. One or more of the hardware processors may be further operable to predict a second decision on gradability of the image with a second confidence score, by training a second classifier based on the set of supervised features. One or more of the hardware processors may be further operable to determine whether the image is gradable or ungradable based on a weighted combination of the first decision and the second decision, the first confidence score and the second confidence score representing respective weights for the first decision and the second decision.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques may be presented that determine image quality of a machine acquired image, for example, retinal scans. The system, method and techniques in one embodiment may include combining unsupervised information from visual saliency maps and supervised information from trained convolutional neural networks (CNNs). In one embodiment, neurobiological principles behind the working of the human visual system may be employed for classifying images as gradable or ungradable. Saliency values may be computed for every pixel, for example, instead of identifying salient regions as done in conventional approaches. Multiscale saliency maps for intensity, texture and curvature features, and filtering operations allows the system and method of the present disclosure in one embodiment to capture information from local and global scales. In one embodiment, additional neurobiological information from the trained CNNs may be extracted.

In one aspect, combining the two sources of information leads to high sensitivity and specificity of the method in one embodiment of the present disclosure. In one embodiment, the system and method may utilize low computation time for a quick assessment of image quality in settings which require a quick decision to determine whether the patients would need a repeat scan.

Retinal image quality assessment (IQA) algorithms use different hand crafted features for training classifiers without considering the working of the human visual system (HVS). The system and method of the present disclosure in one embodiment may use the principles behind the working of the human visual system. Unsupervised information from visual saliency maps and supervised information from trained convolutional neural networks (CNNs) is combined to make a decision on image quality. In one embodiment, an algorithm is proposed that calculates saliency values for every image pixel at multiple scales to capture global and local image information. This is able to extract generalized neurobiological information in an unsupervised manner while CNNs provide a principled approach to feature learning without the need to define hand-crafted features for quality assessment. This enables higher accuracy in decision making. Experimental results demonstrate the superior performance of the algorithm in one embodiment of the present disclosure.

Figure 15A:
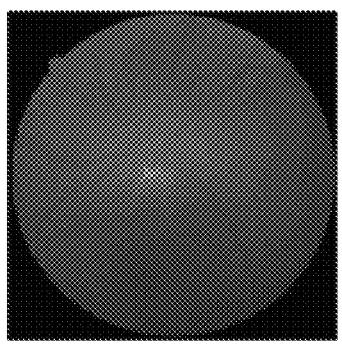
FIGS. 15A-15F shows examples of ungradable images that do not allow for reliable feature extraction.
Figure 15B:
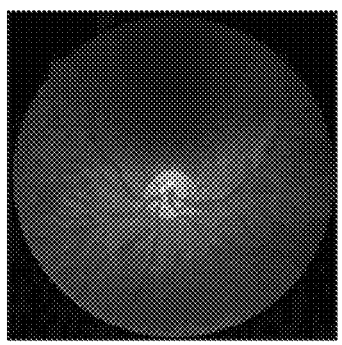
Figure 15C:
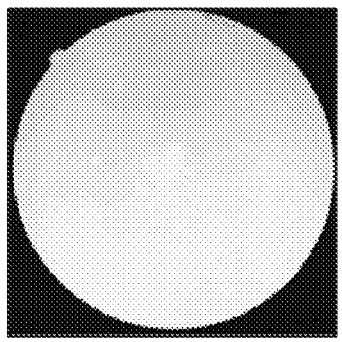
Figure 15D:
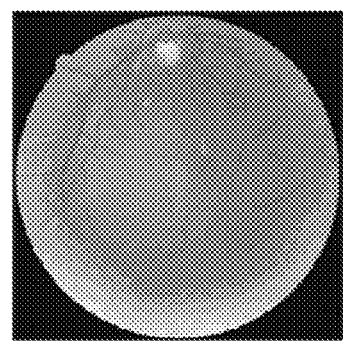
Figure 15E:
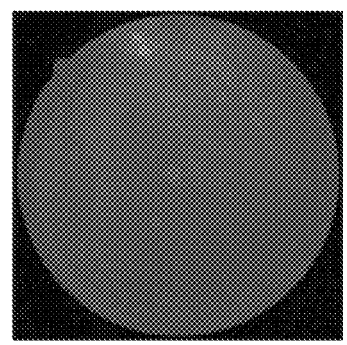
Figure 15F:
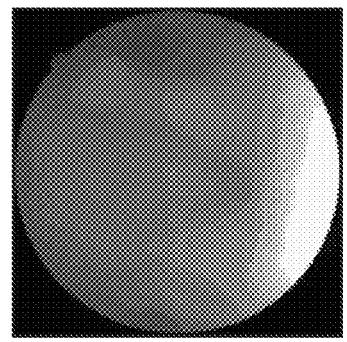

Reliable automated analysis of retinal images requires the images to be of a minimum quality that would facilitate extraction of features crucial for diagnosis. Hence, a reliable image quality monitoring system is a factor in a comprehensive retinal healthcare system. FIGS. 15A-F shows examples of ungradable images that do not allow for reliable feature extraction. FIG. 15A shows poor focus and clarity due to overall haze; FIG. 15B shows poor macula visibility due to uneven illumination over it. FIG. 15C shows poor optic disc visibility due to total blink. FIG. 15D shows edge haze. FIG. 15E shows dust and dirt artifacts near the center of the image. FIG. 15F shows lash artifact. Retinal image quality is impaired by a number of factors which degrade it to the point of making it ungradable. Parameters like focus and clarity, and visibility of the macula and optic disc are used in evaluating quality. In another aspect, image quality assessment can be grouped into two major categories: generic image quality parameters such as focus and clarity, improper cleaning of the camera lens and total eye blink, contrast; and structural quality parameters such as field definition, visibility of the optic disc, and visibility of the macula.

Retinal image quality classification determines the image's usefulness in patient's eye health evaluation. Existing algorithms can be grouped into two types based on the type of extracted features: 1) generic image quality features and; 2) structural features. Algorithms under the first category use simple image measurements to estimate image quality and avoid eye structure segmentation which usually are complex and time consuming tasks. The second category of methods extract structural features in the form of landmarks such as retinal vasculature, optic disc and fovea. Although generic image features are easy to calculate, they are insufficient to make a reliable decision for difficult cases as the features provide very little high level information, e.g., they do not always capture the diversity of conditions affecting image quality. Additionally, a number of different feature maps are calculated without a clear understanding of which are beneficial for the human observer in making a decision. Structural image parameters, while providing more information require complex algorithms for landmark identification and segmentation. Any errors in landmark detection algorithms adversely affect the final assessment. Moreover it is not clear which landmarks are best suited for the specific task. The system and/or method of the present disclosure in one embodiment may overcome these limitations by using models of the human visual system such that the extracted features combine the information obtained from the above two sets of methods, and at the same time are not dependent on arbitrarily identified features or landmarks for quality assessment.

The method and system of the present disclosure in one embodiment provides for the automatic image quality assessment, for example, of retinal image quality in a teleophthalmology setting. The system and/or method of the present disclosure in one embodiment, for example, may take as input a digital fundus image of the retina and perform the following functions: 1) output a decision as to whether the image is of sufficiently good quality for grading purposes; 2) identify possible causes of poor quality of acquired images; 3) apply appropriate algorithms to improve image quality and/or suggest modifications to the image acquisition process to improve image quality, providing an automatic approach to improve image quality based on the output of quality of assessment algorithms.

For performing the above functions, the system and method may include a local saliency maps computed that determine the saliency value of each pixel and is a reflection of that pixel's information content and attractiveness. In one embodiment, local saliency maps may be calculated by incorporating principles behind the working of the human visual system. These saliency maps contribute toward assessing the quality of retinal images. The system and/or method of the present disclosure in one embodiment uses local saliency maps that imitate the working of the human visual system (HVS). The information of the local saliency maps are used in determining image quality and making a decision on the image's gradability.

The system and/or method of the present disclosure in one embodiment combines semantic information from convolutional neural networks (CNNs) with saliency maps to determine image quality. For instance, output of the saliency maps are combined with knowledge from trained CNNs to minimize the subjectivity associated with specific hand crafted features. In this way, semantic knowledge from trained CNNs is leveraged to assist in image quality determination.

The system and/or method of the present disclosure in one embodiment identifies possible factors for poor image quality, suggests changes to the acquisition process and/or applies (executes on a hardware processor) an automated algorithm to improve the image quality and make it suitable for further analysis, for example, use automated methods to correct these errors that contribute to poor image quality. For instance, the outputs of trained classifier are used to identify the reasons behind poor image quality and suggest corrective steps of applying relevant algorithms to improve image quality.

The HVS, in one aspect, works by analyzing low level feature maps and identifying areas within the image that have maximum information content for different tasks. On the other hand CNNs imitate the neuronal response of human visual cortical cells that respond to different sets of stimuli such as regular objects, edges, and the like. A combination of the two approaches gives a principled method to extract generic and structural image information. In one aspect, the combination of the two approaches provides a principled method to extract generic and structural image information, and also provides additional image features learned from training data and eliminates the need for ad-hoc definition of important features and parameter values.

Given a test image, a system in one embodiment of the present disclosure calculates local saliency maps to obtain feature information in an unsupervised manner. The system then passes the test image through a pre-trained CNN to extract features from the fully connected layer in a supervised manner. The test image is also convolved with the set of learned kernels or filters from the trained CNN to obtain a complementary set of supervised features. These features are combined with the unsupervised features from saliency maps to output a decision on the image's gradability based on generic image parameters, and a confidence value associated with the decision. The features from the fully connected layer are used to predict the image's gradability based on structural or landmark information, and also output a confidence value. These two decisions are weighted by their confidence scores to get a final decision of the image's gradability. The confidence scores of the two classifiers determine the factors that contribute to poor image quality. The system in one embodiment may prompt the tele-operator to take appropriate steps to improve image quality. The system in one embodiment may also automatically apply the appropriate image processing steps to improve image quality.

Figure 1:
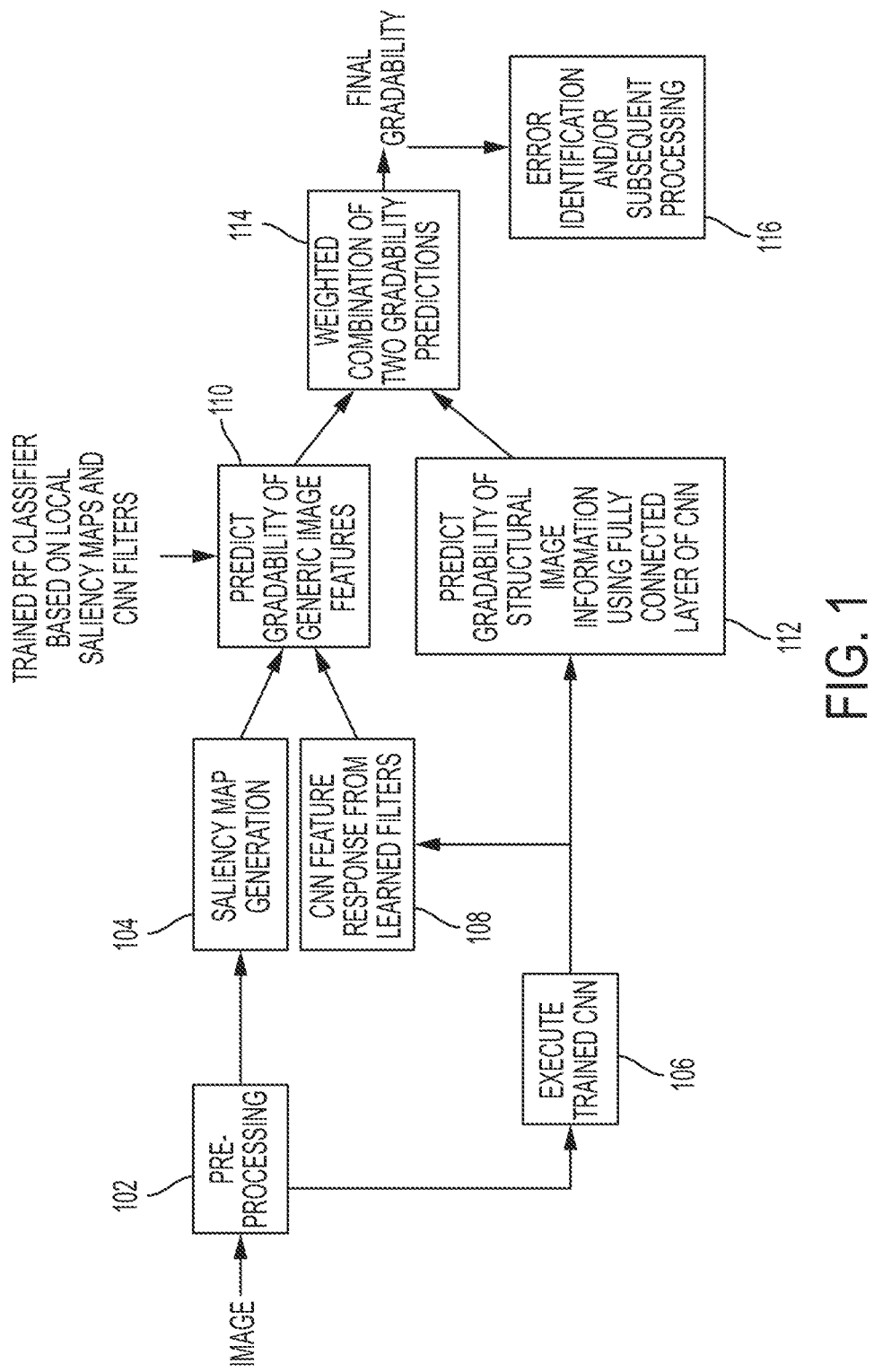
FIG. 1 is a flow diagram illustrating a method of determining image quality in one embodiment of the present disclosure.

FIG. 1 is a flow diagram illustrating a method of determining image quality in one embodiment of the present disclosure. The method in one embodiment is performed by one or more hardware processors. At 102, images may be received or obtained and preprocessed. In one embodiment, the acquired images, for example, color fundus images, are 8 bit color images. For example, in one embodiment, the images may be macula centered or optic disc centered. In one embodiment, the intensities of images span the range of (0-255), which in one embodiment are normalized to [0-1]. For example, the values are divided by 255 to get the normalized intensity image. The images are then resized to $M_1 \times M_1$ pixels before the feature extraction step. For example, the images are resized to 256×256 pixels. In one embodiment, a standard image size is used for performing quality assessment for the entire image.

The following describes the principle of the Itti-Koch saliency model and a saliency model modification performed in one embodiment of the present disclosure. As an example, the original images are 2047×1760 pixels, and are 101 in number which is too few to train a CNN. To have a large training sample the system and/or method of the present disclosure in one embodiment may extract multiple overlapping image patches of 150×150 pixels from these original images. The patch labels are the same as the original images. For example, 150×150 patches can provide appropriate discriminative information in terms of image classification accuracy and computation complexity. The system and/or method of the present disclosure in one embodiment may generate 10,000 such patches from the original 101 images to form the gradable dataset.

Figure 16D:
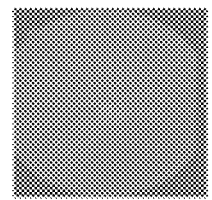
FIGS. 16A-H show an example original image and the output after different types of noise addition and contrast adjustment in one embodiment of the present disclosure.
Figure 16H:
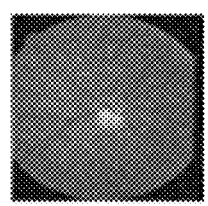
Figure 16C:
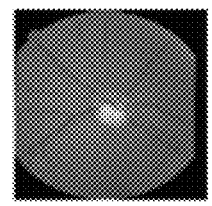
Figure 16G:
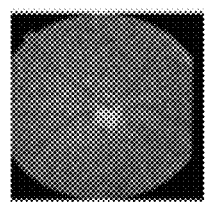
Figure 16B:
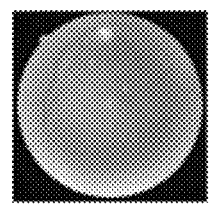
Figure 16F:
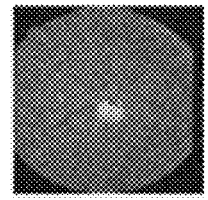
Figure 16A:
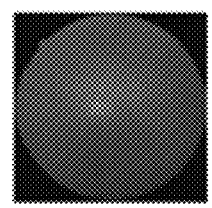
Figure 16E:
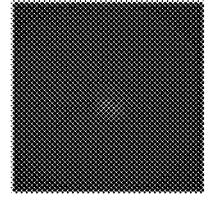

Retina images are ungradable mainly because of presence of noise, artifacts and poor contrast. For experimenting, due to the absence of real ungradable images in the experimental dataset, the system and/or method of the present disclosure in one embodiment may apply different image processing operations such as adding noise and contrast alteration to generate simulated ungradable images. In the first approach, the system and/or method of the present disclosure in one embodiment may add three types of noise using the imnoise function in MATLAB: a) $G_v$ (Gaussian white noise with zero mean and variance v); b) $SP_d$ (salt and pepper noise with noise density d)—affecting $d \times N_I$ pixels, where $N_I$ is the number of pixels in the original image I; and c) $S_v$—speckle noise using the equation 1+n1, where n is uniformly distributed random noise with zero mean and variance v. High levels of added noise will degrade the image more and make it less suitable for grading, however, making it trivial for most algorithms to detect such ungradable images. However, a reliable IQA method should be able to detect even small degree of noise that renders the image unsuitable for grading. Hence, the system and/or method of the present disclosure in one embodiment may add noise of small variance ranging from 0.008 to 0.1. Contrast of the original image is manipulated by altering its intensity distribution using the imtool and imadjust functions in MATLAB. FIGS. 16A-16H show an example original image and the output after different types of noise addition and contrast adjustment. 10,000 such ungradable image patches may be extracted from the simulated images. FIGS. 16A-16B show examples of ungradable images; FIG. 16C shows an example of original color fundus image; FIGS. 16D-E show simulated ungradable images by contrast adjustment. FIG. 16F shows an image with added Gaussian noise; FIG. 16G shows an image with speckle noise. FIG. 16H shows an image with salt and pepper noise.

Referring back to FIG. 1, at 104, saliency map is generated. To generate a saliency map, the images (e.g., the color fundus images) are converted into grayscale, texture and curvature images are generated from them. Saliency maps are then calculated for each of the three images. A saliency map is a representation of an image's information content or attractiveness that draws a viewer's attention. Saliency algorithms are based on findings of psychophysical tests that show the visual cortex in the brain decomposes visual stimuli into multi scale feature maps and then calculates contrast maps before deciding where to focus attention. Contrast maps determine how different a particular point/region (central point) is different from its surroundings. The point on which a person is focusing his attention is the central point which is represented in the visual cortex at high resolution, while the surroundings which are in the peripheral vision are represented at low resolution in the cortex. This is imitated by computational algorithms using multi-scale representation of input images. The images at higher scales (resolutions) represent the central point while the surroundings are represented by images at lower scales. Cross scale difference of feature maps and subsequent selection highlights the most informative region.

Saliency defines the degree to which a particular region is different from its neighbors with respect to certain features like intensity, edge orientation, color, and/or others. It is based on a biologically plausible architecture. For example, visual input is first decomposed into a set of topographic feature maps and different spatial locations compete for saliency within each map. These feature maps are then combined to form a final saliency map that highlights the most salient regions in an image. The image formed on the fovea of the eye is the central object on which a person is focusing his attention to obtain a clear and sharp image. Regions surrounding the central object have a less clear representation on the retina. To simulate this biological mechanism, an image is represented as a Gaussian pyramid comprising of layers of sub-sampled and low-pass filtered images. The central representation of the image on the fovea is equivalent to the image at higher spatial scales, and the surrounding regions are equivalent to the image at lower spatial scales. The contrast, which is an indicator of saliency, is the difference between images at different scales. The original model by Itti-Koch gives a global saliency map highlighting attractive regions in the image.

Figure 2A:
FIGS. 2A and 2B show example saliency map generation in one embodiment of the present disclosure.
Figure 2B:
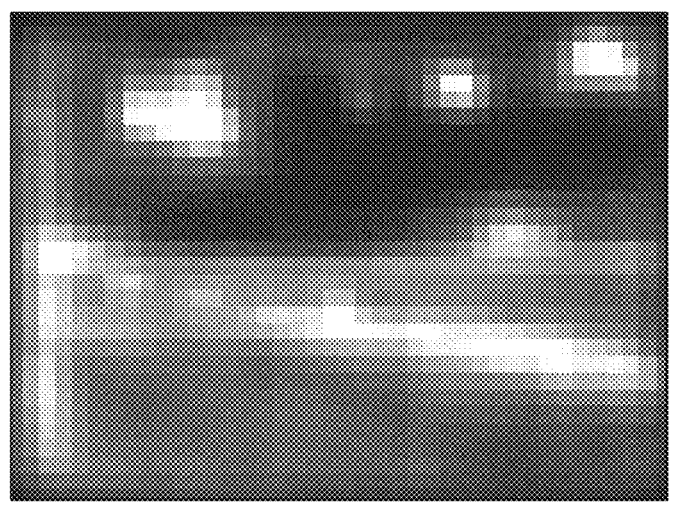
Figure 3A:
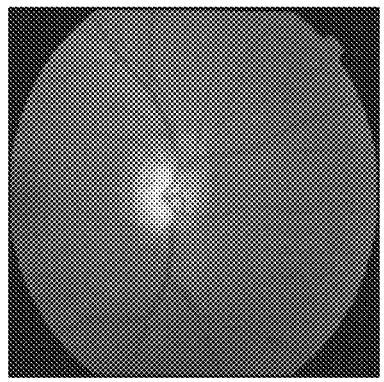
FIGS. 3A-3D show examples of the results of applying different state of the art saliency algorithms to a retinal image in one embodiment of the present disclosure.
Figure 3B:
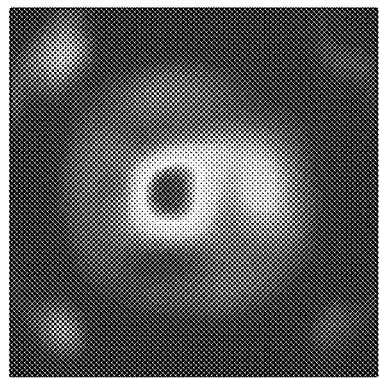
Figure 3C:
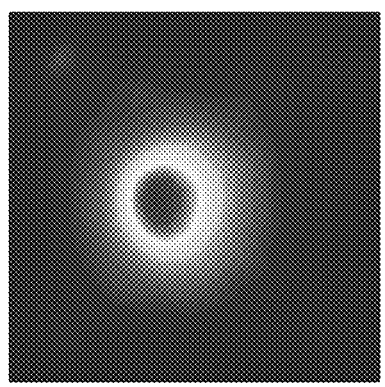
Figure 3D:
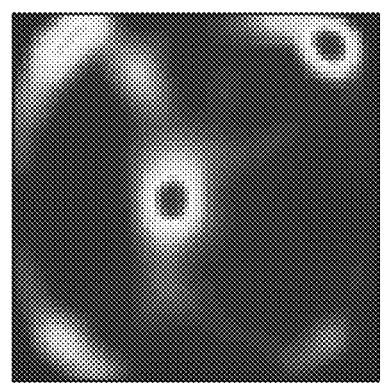

In one embodiment, existing methodologies may be employed to generate a saliency map. FIGS. 2A and 2B show example saliency map generation. FIG. 2B shows an example saliency map of a natural image shown in FIG. 2A. Saliency maps may be generated using a state of the art approach to saliency map calculation that generates a global map highlighting the most salient region in an image. FIGS. 3A-3D show examples of the results of applying different state of the art saliency algorithms to a retinal image. FIG. 3A shows an example image of an original retinal image. FIG. 3B shows saliency map from a Itti-Koch model. FIG. 3C shows saliency map that is generated according to a graph based GBVS method. FIG. 3D shows saliency map that is generated by a signature saliency model.

The saliency maps of FIGS. 3B-3D shows that the saliency maps only highlight certain regions in the image and that there is not much information about the different landmarks such as retinal blood vessels and optic disc in order to make a decision about the image's gradability. The system and method of the present disclosure in one embodiment develops a new saliency model which herein is referred to as local saliency maps.

Figure 4:
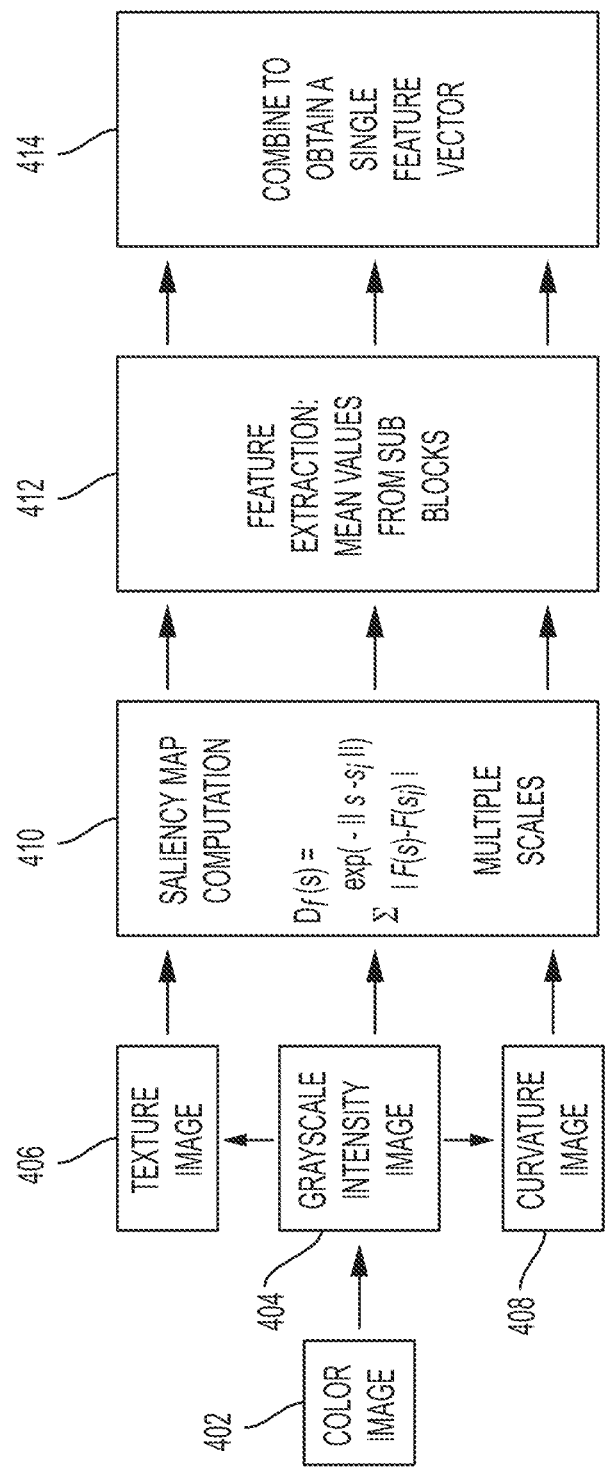
FIG. 4 is a block diagram illustrating a method of feature extraction in one embodiment of the present disclosure.

FIG. 4 is a block diagram illustrating a method of feature extraction in one embodiment of the present disclosure. At 402, an image data is received, for example, machine acquired color image data is received or obtained. The local saliency maps of the present disclosure in one embodiment may be generated with modifications to an existing model, for example, Itti-Koch mode. In this new model of the present disclosure in one embodiment, saliency values are calculated for every pixel, such that these values are representative of their uniqueness with respect to the neighborhood. Image quality assessment in one embodiment incorporates both local and global features of local saliency maps. The received image may be resized into a defined pixel size, e.g., 256×256. The resized color image is converted to gray scale intensity at 404, and texture and curvature maps are obtained from this grayscale image at 406 and 408.

At 410, multiscale saliency maps are generated from these feature maps. According to neurobiological studies the response function of cortical cells is Gaussian, i.e., further away a point less is its influence on the central pixel. Thus to calculate a pixel's uniqueness from its surroundings a sum of weighted difference of feature values is calculated, i.e., $$D_F(s) = \Sigma \exp(-\|s-s_i\|)|F(s)-F(s_i)| \qquad (1)$$

where $D_F$ indicates the difference map for feature F; $s_i$ is the i-th pixel in the N×N neighborhood of pixel s; $\|s-s_i\|$ denotes the Euclidean distance between s and $s_i$. $F(s_i)$ denotes the feature value at pixel $s_i$. This gives a saliency value for each pixel. By varying the value of N, the system and/or method of the present disclosure in one embodiment can generate local saliency maps at different scales and thus capture relevant information at varying levels of detail.

For instance, the system and/or method of the present disclosure in one embodiment may select and use different values of N (e.g., 5×5, 11×11, 19×19, 31×31 and 41×41) to get saliency maps for intensity, texture and curvature at varying scales that capture local and global information.

Figure 5A:
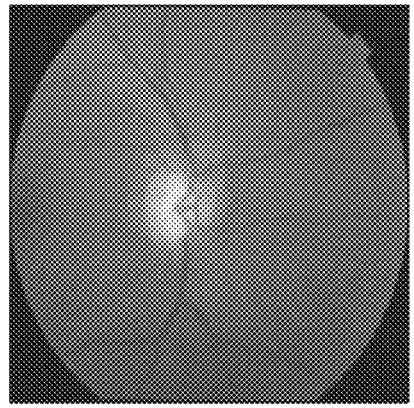
FIGS. 5A-5D show an example of a gradable retinal image and the saliency maps generated using different values of N in one embodiment of the present disclosure.
Figure 5B:
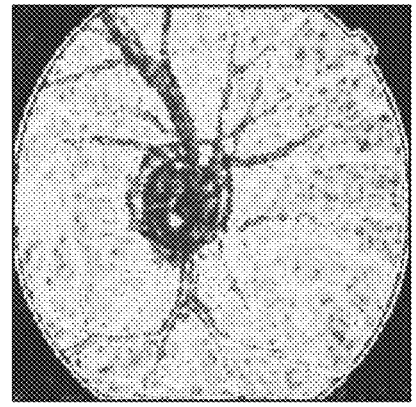
Figure 5C:
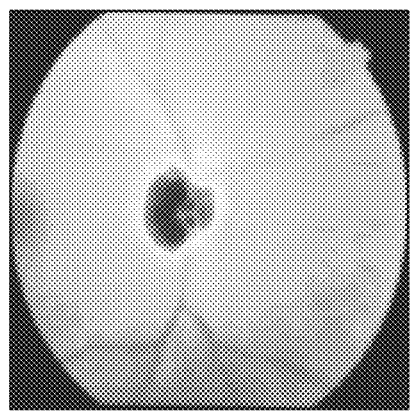
Figure 5D:
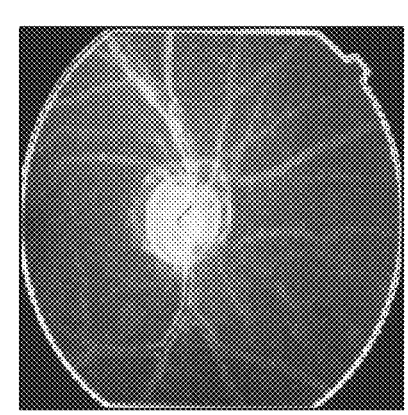

FIGS. 5A-5D show an example of a gradable retinal image and the saliency maps generated using different values of N in one embodiment of the present disclosure. FIG. 5A shows an example of an original gradable retinal image. FIGS. 5B-5D show examples of corresponding local saliency maps at different scales. These maps show much greater level of detail than the saliency maps shown in FIGS. 3A-3D. By choosing different values, the system and/or method of the present disclosure in one embodiment can combine global saliency information (providing generic image information) and local saliency information (providing detailed structural information).

Referring to FIG. 4, each of the saliency maps are divided into sub-blocks at 412 and the mean value of these sub blocks are combined to represent the saliency maps by a single feature vector at 414. For example, 5 different scales (windows) for each of the 3 saliency maps gives a total of 15 saliency maps. Each of these maps is divided into non-overlapping 64×64 blocks, giving a total of 16 blocks (e.g., 256×256 pixel map divided by 64×64 pixel blocks). The mean pixel value of each block is calculated to give a 16 feature values for one map. The total number of features from the 15 maps is (16×15=) 240.

Figure 6A:
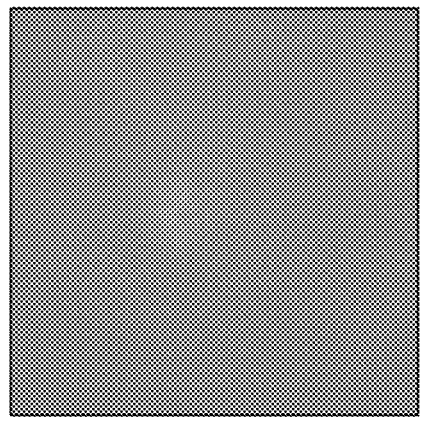
FIGS. 6A-6D show the same image and corresponding saliency maps as shown in FIG. 5A, but rendered ungradable by contrast adjustment in one embodiment of the present disclosure.
Figure 6B:
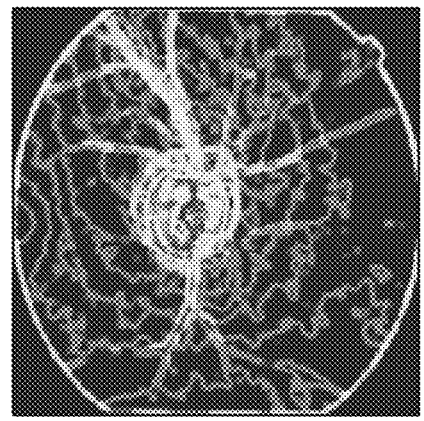
Figure 6C:
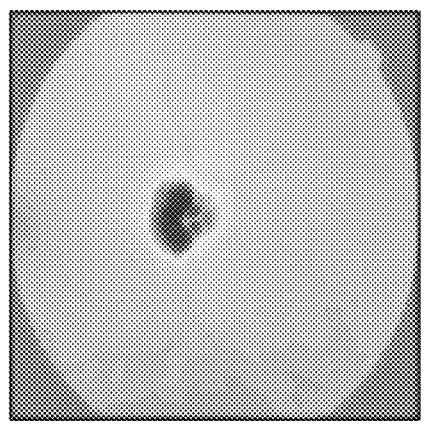
Figure 6D:
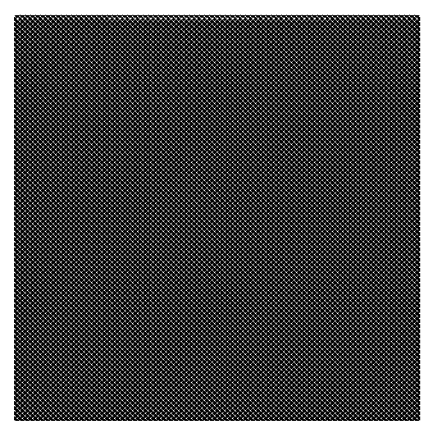

FIGS. 6A-6D show the same image and corresponding saliency maps as shown in FIG. 5A, but rendered ungradable by contrast adjustment in one embodiment of the present disclosure. FIG. 6A shows an example of a simulated ungradable image. FIGS. 6B-6D show examples of corresponding local saliency maps at different scales. The local saliency map produces different results for the two images used in identifying the ungradable images.

A comparative study of the maps (e.g., shown in FIGS. 3A-3D, 5A-5D, and 6A-6D highlights the following points:

1) the present disclosure's local saliency maps provide more discriminative information than the global saliency maps which only highlights the optic disc region as the most salient region. 2) the local saliency maps are able to capture different levels of local and global information by varying the operation scale. 3) local saliency maps are much better than the global saliency maps in discriminating between gradable and ungradable images. Those sets of results illustrate the local saliency maps of the present disclosure in one embodiment may provide a better tool than the conventional saliency maps in identifying image quality.

Referring back to FIG. 1, at 106, a trained CNN is applied to the received and preprocessed image at 102. The CNN outputs learned kernels 108, for example, when convolved with an image highlight different regions of the image used for image quality assessment, and learned knowledge from the fully connected layer represented as a feature vector. CNN training in one embodiment of the present disclosure is described below with reference to FIG. 8.

Figure 8:
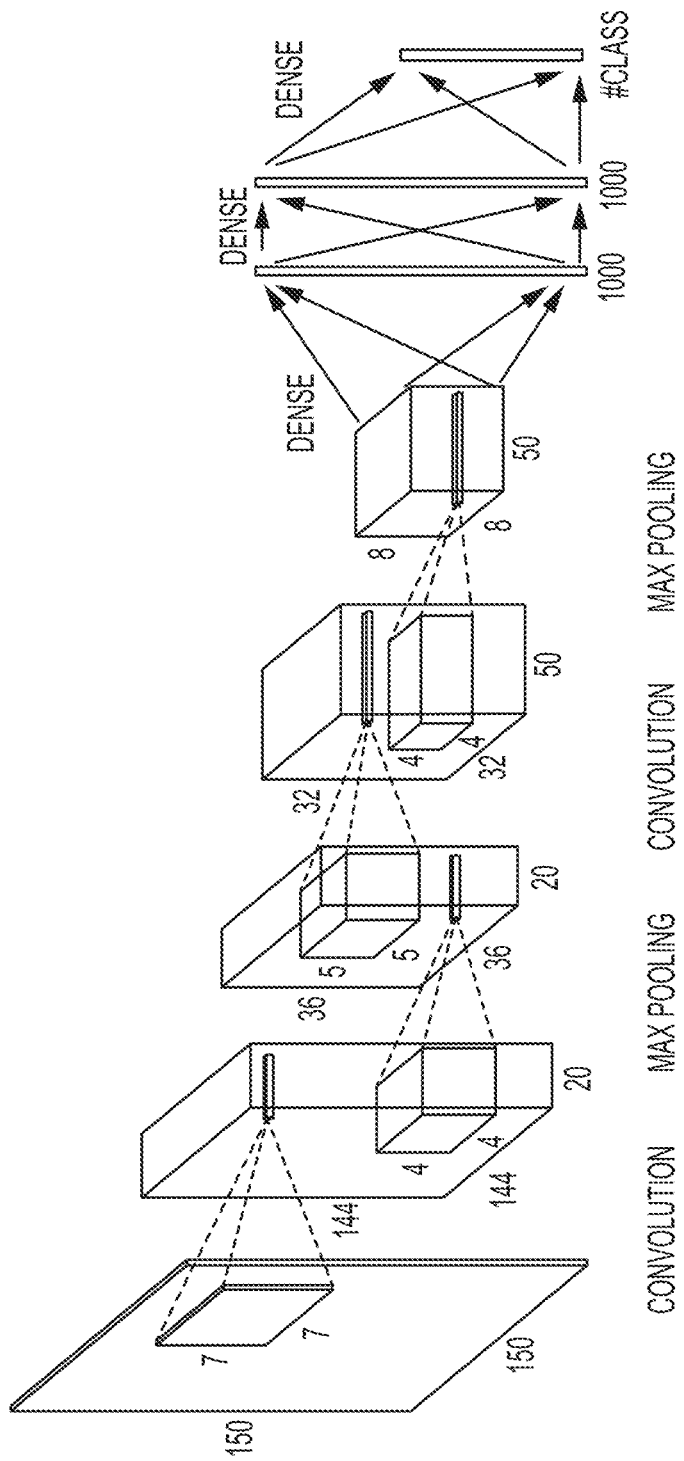
FIG. 8 shows a schematic of a convolutional neural network training methodology in one embodiment of the present disclosure.

FIG. 8 shows a schematic of a convolutional neural network training architecture used in CNN based classification system for assessing image quality in one embodiment of the present disclosure. In one embodiment, patches of size N×N are extracted from the resized image and each patch is convolved through a set of k1 kernels each of size p1×p1 to produce k1 different feature maps of size N×N. These maps are max pooled using a 4×4 window to give patches of size N/4×N/4. Each of the k1 patches are further subjected to convolution through a set of k2 kernels to give a new set of k1×k2 feature maps. These feature maps undergo another set of max pooling operation (patch size reduced to N/16×N/16) and the output is the input to a fully connected layer whose output is a reduced dimension feature that acts as the feature vector for classification using a soft max classifier.

Figure 9:
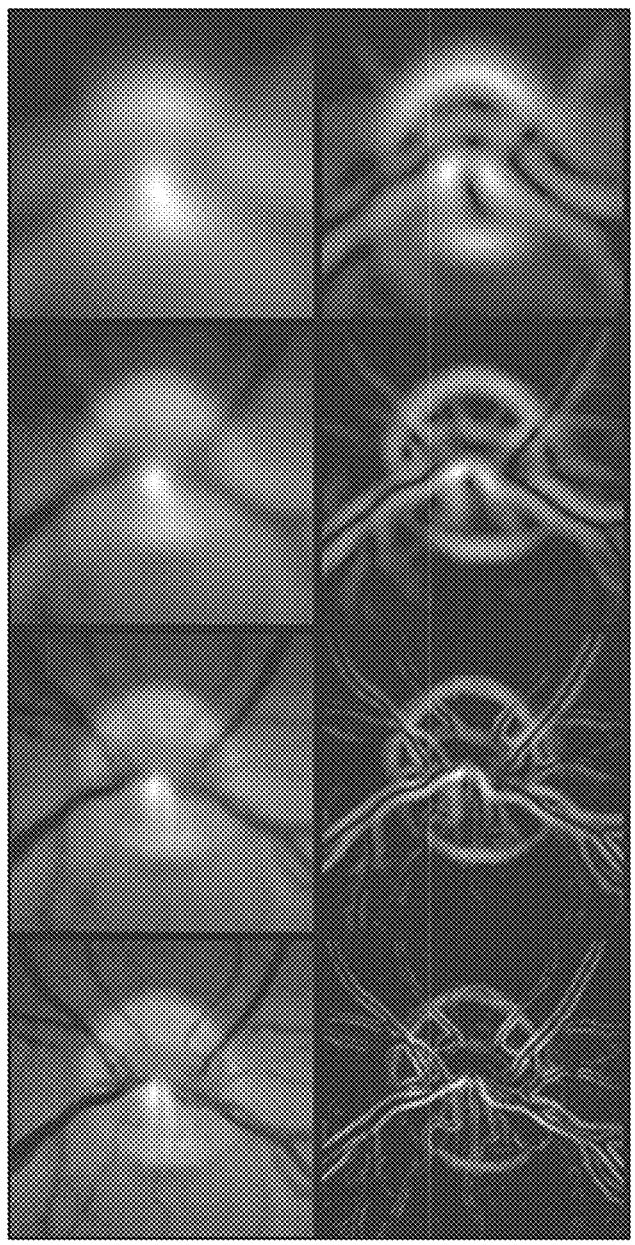
FIG. 9 shows output of convolving different learned filters with the original image in one embodiment of the present disclosure.

The system and/or method of the present disclosure in one embodiment leverages the knowledge from trained CNNs and extracts semantic information for improving classification accuracy. In one embodiment, the trained CNN provides two types of semantic information. The first type comes from the learned kernels in the second layer. These kernels when convolved with an image highlight different regions of the retina for image quality assessment (see FIG. 9). FIG. 9 shows output of convolving different learned filters with the original image in one embodiment of the present disclosure. The second type of information is derived from the 1000 dimensional fully connected layer just prior to the classification layer. Conceptually the fully connected layer combines the learned knowledge in the trained CNN and represents them as a single feature vector. These two distinct information types are combined with the features from saliency maps to predict the image quality.

As an example in one embodiment, the architecture of the network shown in FIG. 8 may be summarized as 150×150-36×36×20-8×8×50-1000-1000-M, where M is the number of classes. In this example, the first convolutional layer includes 20 kernels, each of size 7×7, followed by a 4×4 pooling that reduces the each feature map to 36×36. The second convolutional layer contains 50 kernels each of size 5×5. Each kernel is convolved with all 20 feature maps of the previous layer, followed by 4×4 pooling that produces 50×20 feature maps of size 8×8. Two fully connected layers of 1000 nodes follow the convolution and pooling layers. The last layer is a logistic regression with softmax that outputs the probability on each class, $$P(y=i\mid W, b) = \frac{\exp^{W_i x + b_i}}{\sum_{j=1}^{M} \exp^{W_j x + b_j}} \quad (2)$$

where x is the output of the second fully connected layer, $W_i$ and $b_i$ are the weights and biases of the $i^{th}$ neuron in this layer, and M is the number of classes. The class that outputs the maximum probability is taken as the predicted class $$\hat{y} = \operatorname*{argmax}_{i} P(y=i\mid W, b) \quad (3)$$

where $\hat{y}$ denotes the predicted class (either gradable or ungradable).

In one embodiment, instead of traditional sigmoid or tanh neurons, the network may use Rectified Linear Units (ReLUs) in the convolutional and fully connected layers. This may provide speedup in training. An ReLU has an output of $f(x)=\max(0; x)$ where x denotes the input. It is observed that ReLUs enable the training to complete several times faster and are not sensitive to the scale of input.

Figure 10:
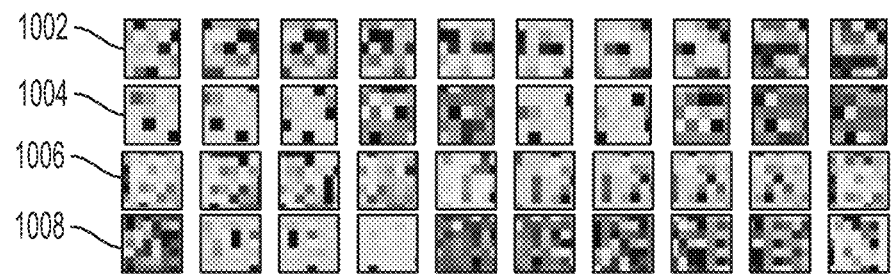
FIG. 10 shows examples of learned filters of different image types from different layers, example learned filters of each class from the two layers in one embodiment of the present disclosure.

Training of the CNN may be performed as follows. In one embodiment, the system and/or method of the present disclosure may use negative log-likelihood as the loss function and perform Stochastic Gradient Descent (SGD). The system and/or method of the present disclosure in one embodiment may implement dropout during training where the neuron outputs are masked out with probability of 0.5, and at test time their outputs are halved. Dropout alleviates overfitting by introducing random noise to training samples and boosts the performance of large networks. Since applying dropout to all layers increases the training time, the system and/or method of the present disclosure in one embodiment may only apply dropout at the second fully connected layer, i.e., half of the outputs of the second fully connected layer may be randomly masked out in training, and in testing the weights of the logistic regression layer may be divided by 2, which is equivalent to halving the outputs of the second fully connected layer. FIG. 10 example learned filters of each class from the two layers in one embodiment of the present disclosure. FIG. 10 shows examples of learned filters of different image types from different layers: (a) gradable class from layer 1 (1002); (b) ungradable class from layer 1 (1004); (c) gradable class from layer 2 (1006); (d) ungradable class from layer 2 (1008).

Referring back to FIG. 1, in one embodiment, prediction of image quality (e.g., shown in FIG. 1 at 110 and 112) may be performed as follows. For example, denote the feature vector obtained from saliency maps as $f_1$ (e.g., FIG. 1 at 104). After convolving the CNN kernels from the second layer with the original image, the system and/or method of the present disclosure in one embodiment divides the output image into distinct sub-blocks, and the mean values of the sub blocks are concatenated to give another feature vector which is denote as $f_2$ (e.g., FIG. 1 at 108). The dimensional feature vector (e.g., the 1000 dimensional feature vector) from the fully connected layer is denoted as $f_3$ (e.g., FIG. 1 at 112).

In one embodiment, feature vectors $f_1$ and $f_2$ are concatenated and used to train a classifier (e.g., Random forest (RF) classifier) that can predict the label of a test image (e.g., 0 for ungradable images and 1 for gradable images), for example, as shown in FIG. 1 at 110. This RF classifier is denoted as $RF_1$. Similarly in one embodiment, the feature vector $f_3$ is used to train another classifier, (e.g., another RF classifier) to predict image labels, and denoted as $RF_2$ as shown in FIG. 1 at 112. A feature of RF is that they output a probability score associated with each prediction that acts as a confidence score for each classifier. In one embodiment, the final classification label is determined by the weighted combination of the labels of the individual classifiers ($RF_1$ and $RF_2$), with the confidence scores acting as the weights as shown in FIG. 1 at 114.

In another embodiment, the feature vector obtained from saliency maps $f_1$ and the 1000 dimensional feature vector from the last fully connected layer of the CNN $f_2$ may be used to train two different Random forest (RF) classifiers (denoted as $RF_1$ and $RF_2$) for predicting the gradability of an image (0 for ungradable images and 1 for gradable images). RF outputs a probability score associated with each prediction that acts as a confidence score for each classifier.

In one embodiment, the final classification label (C) is determined by the weighted combination of the labels of the individual classifiers with the confidence scores acting as the weights, $$C = \frac{w_{1,1} + w_{1,2}}{2} \quad (4)$$

where $w_{1,1}$ is the confidence score (probability) of $RF_1$ predicting class 1 and $w_{1,2}$ is the confidence score of $RF_2$ predicting class 1. If C>0.5 then the final prediction is class 1 (gradable), else the image is deemed ungradable. An advantage of this approach is the scope of combining the decisions of both classifiers which separately make decisions based on the supervised and unsupervised information from the images. For instance, concatenating feature vectors $f_1$, $f_3$ and training a single RF classifier may cause these two set of features lose their discriminative power.

Referring to FIG. 1, at 116, one or more reasons for poor quality in an image may be identified. For example, the confidence scores determined at 110 and 112 identify one or more factors behind poor image quality. If the classifier $RF_1$ identifies the image as ungradable with high confidence then it indicates poor generic image information and the probable causes are improper illumination, color saturation, and similar factors. This may call for one type of corrective action, e.g., to ensure proper position of the eye, and illumination. If $RF_2$ classifies the image as ungradable with high confidence then the acquired structural information is poor. This may call for another set of corrective action, e.g., ensuring that the lens is clean, no blinking of eye occurs and the field of view is right. Based on the value of confidence scores the system and/or method of the present disclosure in one embodiment identify the possible reasons for the acquisition of poor image quality, and accordingly prompts the operator to take corrective action, or automatically performs the corrective action. In one embodiment, a graphical user interface may be provided that presents to the user the results, and for example, the possible reasons. The graphical user interface may provide visual image or images along with the associated results.

Automatic image quality enhancement, for example, for performing automatic corrective action, in one embodiment of the present disclosure may include applying or executing an automated algorithm to improve the image quality. For example, if the system and/or method of the present disclosure identify that generic image information was not adequately extracted from the acquired image, the system and/or method of the present disclosure may apply or execute methods to change the image contrast (by histogram adjustment), or change the image illumination (by suppressing high intensity values). As another example, if the system and/or method of the present disclosure identify that structural information was not satisfactorily extracted the system and/or method of the present disclosure may apply or execute filtering operations to enhance structural information (e.g., denoising algorithms to improve image sharpness, or entropy filtering to highlight structures). The system and/or method of the present disclosure may thus automatically improve the quality of acquired images, e.g., if a second acquisition is not feasible due to various reasons.

The following describes experiments and results of image quality assessment in one embodiment of the present disclosure. An available dataset was used for the experiments, which has a total of 101 images divided into 50 training and 51 test images whose purpose is to evaluate optic cup and disc segmentation performance for the purpose of glaucoma diagnosis. All images were taken with the eyes dilated, centered on the optic disc with a Field of-View of 30-degrees and final dimension 2047×1760 pixels in PNG uncompressed image format. It was assumed all the 101 images as gradable since they have been examined for glaucoma diagnosis.

A given test image is first separately classified based on its saliency map (the unsupervised information) and the trained CNN architecture (the supervised part). The test image is put through the same stages as in CNN training and the soft-max classifier provides the image label as gradable or ungradable. The CNN was trained using 150×150 patches and to check for the robustness of the trained network to different image sizes, two different experiments are performed. In the first, the given test image was downsampled to 150×150 and its classification result was denoted as $RF_{2,150\times150}$. In the second experiment, the trained filters were convolved on non-overlapping 150×150 patches such that these patches cover the entire image. The classification output of these patches (0 for ungradable and 1 for gradable) was collected and the mean value calculated as:

$$M = \frac{n_1 \times 0 + n_2 \times 1}{n_1 + n_2} \quad (5)$$

where $n_1$ is the number of patches classified as 0 and $n_2$ is the number of samples classified as 1. If M>0.5 the image is classified as gradable, else it is determined to be ungradable. This classification result was denoted as $RF_{2,\ mean}$. Results were compared using the label of the majority class but the results were no different from the mean valued approach. Experimental results show that $RF_2$, mean (with accuracy of 99.87%) outperformed $RF_{2,\ 150\times150}$ (accuracy of 92.1%). Downsampling of the original images leads to information loss that hampers the final classification performance. Thus, in all subsequent experiments a test image is classified using the approach of $RF_{2,\ mean}$ whose output is equivalent to $RF_2$.

In one aspect, results of the method in one embodiment are denoted as $RF_{1+2}$ and its results are compared with the following methods: $RF_{All}$ where the feature vectors $f_1$, $f_2$ are concatenated in a single vector to give a single classification; $SVM_{All}$—support vector machines using $f_1$, $f_2$ with linear kernels for classification; RF1+SM–weighted combination of outputs of $RF_1$ and the CNN softmax classifier for predicting the gradability. A soft max classifier is part of the CNN and it also outputs probability scores that can act as weights, similar to the RF classifier. Other results are also compared. Two modifications to original architecture in the present disclosure have been attempted: First, the methodology used 5×5 kernels in the first layer followed by unchanged 5×5 kernels in the second layer. This is denoted as $RF_{2,5\times5}$. The other modification is using 9×9 kernels in the first layer followed by 5×5 kernels in the second layer ($RF_{2,9\times9}$). An original method ($RF_2$) uses 7×7 kernels in the first layer.

The 101 images were the gradable dataset and the ungradable dataset is a combination of all types of noisy and contrast adjusted images. There were 202 ungradable images with approximately equal samples of each type (Gaussian noise, speckle noise, salt and pepper noise, high saturation and low contrast). Experiments show if the ratio of the samples of two classes is greater than 2.5, the classifier is biased towards the class with more samples. Hence, in one embodiment, the maximum ratio of gradable to ungradable images is limited to 2.

In the experiment, Sensitivity (Sen), Specificity (Spe) and Accuracy (Acc) data were measured using 10-fold cross validation. High sensitivity (100%), specificity (99.8) and accuracy values (99.87) are obtained, which outperforms current state-of-the-art methods for the experimental dataset. The experiments show that method in one embodiment of the present disclosure is also more robust to lower levels of added noise. The p-values from a paired t-test with the results of $RF_{1+2}$ show the significant improvement brought about by using principles of neurobiology and working of the HVS for quality assessment. Results of $RF_{2,9\times9}$ and $RF_{2,5\times5}$ justify using 7×7 kernels in the first layer. Similar results also influenced a decision to use 5×5 kernels in the second layer.

Figure 11A:
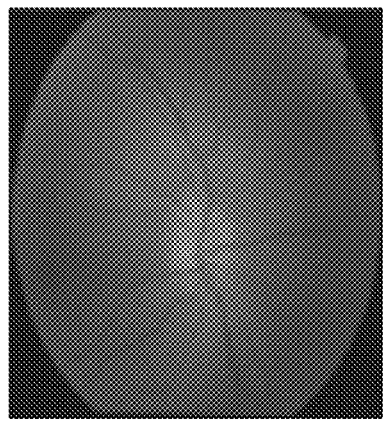
FIGS. 11A-11B show examples of gradable images which were correctly classified by CNN as gradable in one embodiment of the present disclosure.
Figure 11B:
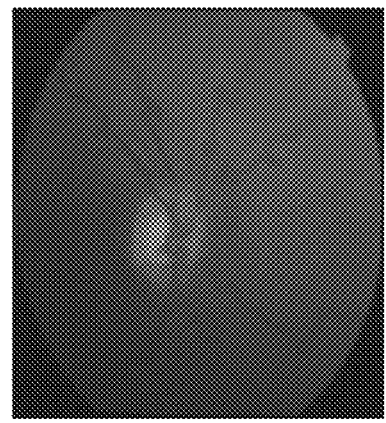
Figure 11C:
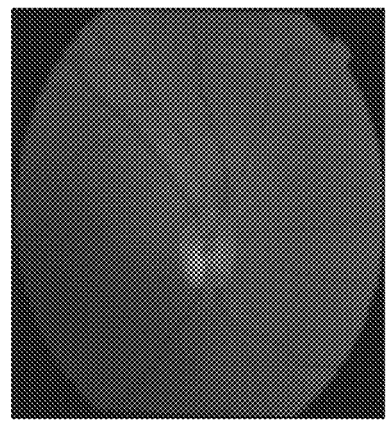
FIGS. 11C-11D show examples of ungradable images which were classified as ungradable by a methodology of the present disclosure in one embodiment.
Figure 11D:
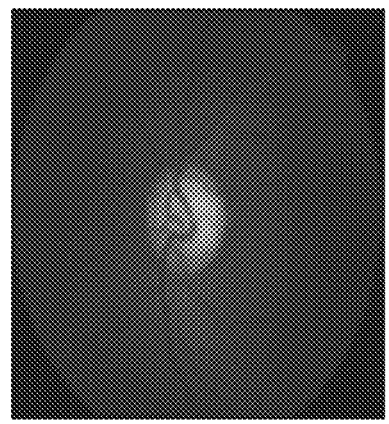

FIGS. 11A-11B show examples of gradable images which were correctly classified by CNN as gradable but incorrectly classified by other existing methods. This was probably due to uneven illumination and intensity saturation at some parts. FIGS. 11C-11D show the opposite case where ungradable images were classified as gradable by existing methods, but not by $RF_{1+2}$.

In one embodiment, the method of the present disclosure in one embodiment may be implemented in MATLAB on a Intel Core 2.3 GHz i-5 CPU running Windows 7 with 8 GB RAM. The average computation time for classifying a test image is 8.2 seconds with the method in one embodiment of the present disclosure using non-optimized code. Although not real time, classification time is small enough to make a quick decision about repeat scans. Optimized code implementation may be utilized to lower the decision time. In the experiment, the average training time for 10,000 patches from each class is 14 hours; Feature extraction from saliency maps and its classification takes 3.2 seconds while feature extraction from CNNs and classification takes 4.7 seconds with a further 0.3 seconds for fusing the two decisions.

Figure 12:
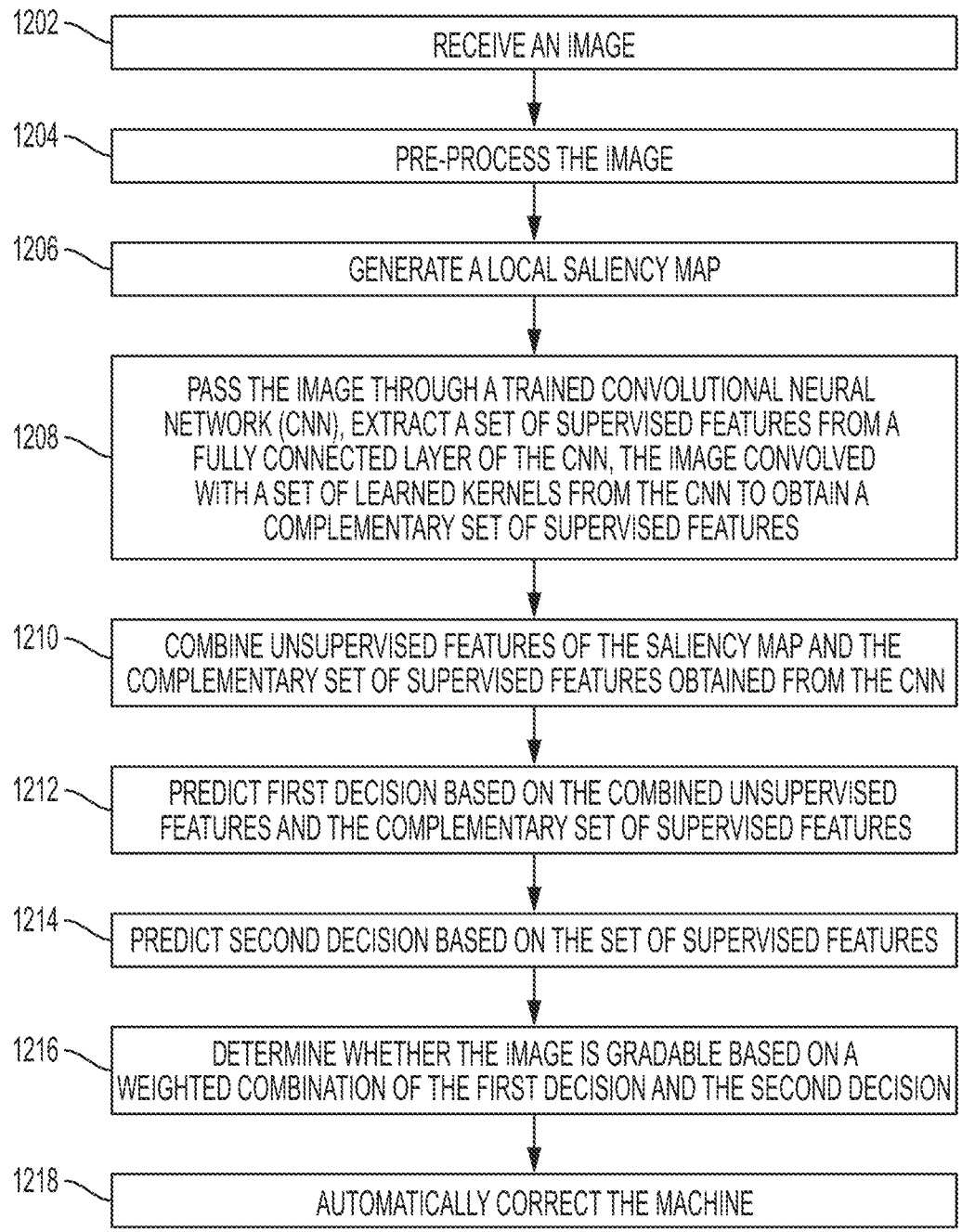
FIG. 12 is a flow diagram illustrating a method of determining the quality of a machine acquired image in one embodiment of the present disclosure.

FIG. 12 is a flow diagram illustrating a method of determining the quality of a machine acquired image in one embodiment of the present disclosure. The method performed by one or more hardware processors. At 1202, an image, for example, generated by a machine, is received. In one embodiment, the image includes an 8 bit color image with intensities spanning the range of 0-255. The image in one embodiment is a color fundus image.

At 1204, the image may be pre-processed. For example, the image is normalized, e.g., the intensity values of image pixels are normalized. The normalized intensity image is resized, e.g., to a defined pixel size, e.g., a square image of pixels, e.g., m×m pixels, wherein the local saliency map is generated from the normalized and resized image.

At 1206, a local saliency map of the image is generated to obtain a set of unsupervised features using unsupervised learning. For instance, as described above, the local saliency map may be generated using one or more models of a human visual system. For example, as described above, the generating of the local saliency map may include converting the image into a grayscale intensity image, generating texture image and curvature image based on the grayscale intensity image, generating multi-scale saliency maps at a plurality of different scales based on the grayscale intensity image, the texture image and the curvature map, wherein a saliency value is computed for every pixel, the multi-scale saliency maps capturing local and global information of the image, determining mean pixel values of sub-blocks of the multi-scale saliency maps, and combining the mean pixel values to obtain a single feature vector to represent the local saliency map.

At 1208, the image is passed or applied through a trained convolutional neural network (CNN) to extract a set of supervised features from a fully connected layer of the CNN using supervised learning, the image convolved with a set of learned kernels from the CNN to obtain a complementary set of supervised features, for example, e.g., as described above.

At 1210, the set of unsupervised features and the complementary set of supervised features are combined, e.g., as described above.

At 1212, a first decision on gradability of the image is predicted with a first confidence score, by training a first classifier based on a combined set of unsupervised features and the complementary set of supervised features, e.g., as described above.

At 1214, a second decision on gradability of the image is predicted with a second confidence score, by training a second classifier based on the set of supervised features, e.g., as described above. In one embodiment, the first classifier and the second classifier may include a random forest classifier that predicts the label of the image.

At 1216, it is determined as to whether the image is gradable or ungradable, e.g., as described above, based on a weighted combination of the first decision and the second decision, the first confidence score and the second confidence score representing respective weights for the first decision and the second decision.

At 1218, the method may also include automatically correcting the machine to generate a gradable image responsive to determining the image is ungradable.

Figure 13:
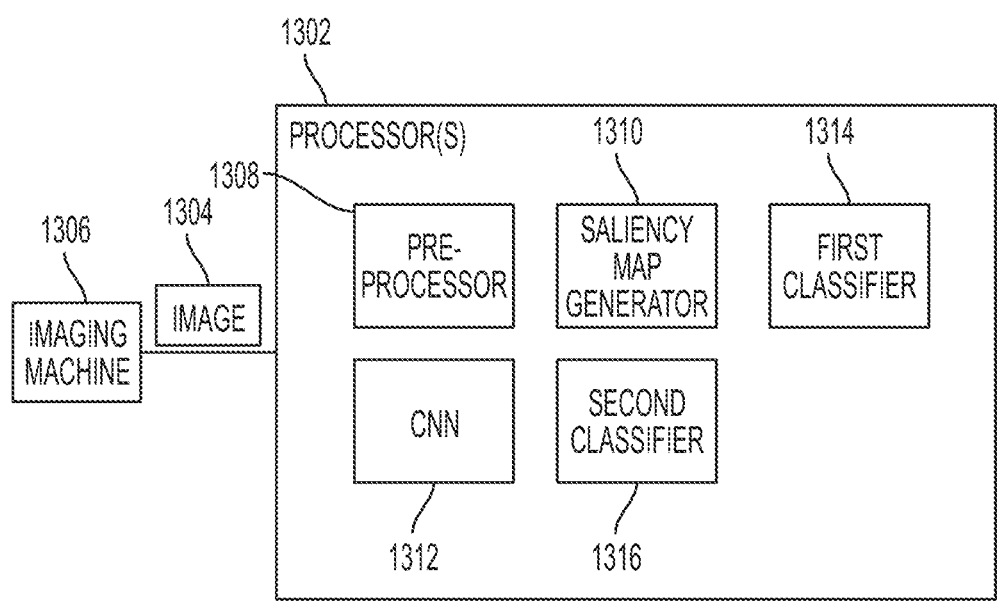
FIG. 13 is a diagram showing components of a system in one embodiment of the present disclosure.

FIG. 13 is a diagram showing components of a system in one embodiment of the present disclosure. One or more hardware processors 1302 may receive an image 1304 generated by a machine 1306. One or more of the hardware processors 1302, e.g., a preprocessing functionality 1308, may preprocess the image, e.g., normalize the intensity values of the image pixels and resize the image into a defined pixel size.

One or more of the hardware processors 1302, e.g., a saliency map generator or functionality 1310 generates a local saliency map of the image to obtain a set of unsupervised features using unsupervised learning. One or more of the hardware processors 1302 applies the image through a trained CNN functionality 1312, and extracts a set of supervised features from a fully connected layer of the CNN using supervised learning. One or more of the hardware processors 1302 also obtains a complementary set of supervised features by convolving the image with a set of learned kernels from the CNN.

One or more of the hardware processors 1302, predicts a first decision on gradability of the image with a first confidence score, e.g., by training a first classifier 1314 based on a combined set of unsupervised features and the complementary set of supervised features.

One or more of the hardware processors 1302, predicts a second decision on gradability of the image is predicted with a second confidence score, by training a second classifier 1316 based on the set of supervised features.

Based on a weighted combination of the first decision and the second decision, the first confidence score and the second confidence score representing respective weights for the first decision and the second decision, one or more of the hardware processors 1302 determines whether the image is gradable or ungradable. Responsive to determining that the image is ungradable, one or more of the hardware processors 1302 may automatically correct the machine 1306 to generate a gradable image.

The system for example performs automatic image quality assessment, e.g., using principles behind the working of the human visual system. The system may include a subsystem that generates local saliency maps of a given image, e.g., a given retinal image to determine its image quality in a tele-ophthalmology application. The system may also include a subsystem that convolves the given retinal image with a set of learned filters to determine the image's gradability in a tele-ophthalmology application. The system may also include a subsystem that combines the decisions of above two subsystems to make a final decision of the image's gradability. In one embodiment, this subsystem also identifies possible reasons for poor image quality and suggests steps that improve the image quality to the remote operator. The system may also include a subsystem that automatically applies appropriate image processing algorithms to improve the image quality. The choice of applied algorithms may depend upon the output of subsystem that determines image's gradability and one or more reasons for poor image quality. In one embodiment, local saliency maps are generated based on the principles behind the working of the human visual system and the informativeness or saliency of each pixel is calculated, e.g., instead of identifying global salient regions. In one embodiment, semantic information is extracted from trained CNNs about the working of the human visual system in the form of trained filter kernels and responses. In one embodiment, one or more factors behind poor image quality are identified based on classifier decisions.

Figure 14:
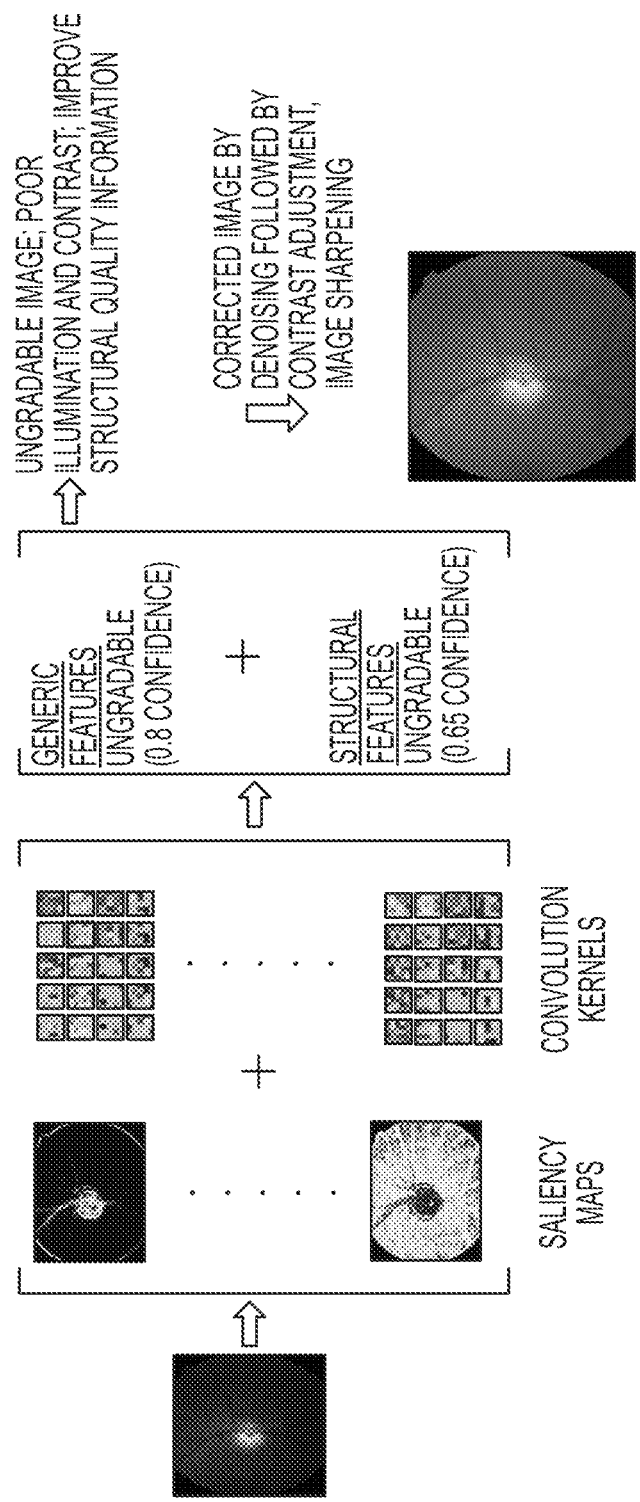
FIG. 14 shows an example output of different stages of a system in one embodiment of the present disclosure.

FIG. 14 shows an example output of different stages of a system in one embodiment of the present disclosure. The test image is processed to get a set of saliency maps, and the image is also convolved with a set of kernels learned during the training step. Based on the features extracted from these maps two predictions may be made, e.g., by the generic and structural quality classifiers. A decision may specify that the image is ungradable and the possible reasons may be poor illumination as well as inadequate structural information. Subsequent steps may automatically apply denoising and contrast adjustment methods followed by image sharpening, e.g., in an iterative manner. Such automatic correction improves the image quality to the extent that it can be graded by either an expert or other automated algorithms.

Teleophthalmology is a medium for retinal screening systems for diabetic retinopathy (DR), and other eye conditions. A step in such systems is image quality assessment that determines whether the acquired image is of sufficient quality for subsequent grading and evaluation. DR has become an important healthcare concern all over the world and requires more trained clinicians to evaluate patients. However, there is a significant shortage of trained ophthalmologists to care for the increasing population with DR, particularly in remote and rural areas.

Teleophthalmology is particularly relevant for locations which have limited access to clinical specialists and resources. In urban areas it is fairly easy to access specialists who can acquire patient images, identify poor quality images and have a quick second scan when necessary. However, access to specialists or trained operators of image acquisition devices is difficult in remote/rural settings. In such scenarios it is beneficial to acquire images using mobile devices such as smart phones or tablet computers. Retinal image acquisition using mobile devices may require special hardware to image the retinal structure. Even if such hardware can be made available easily, the following challenges need to be addressed for a teleophthalmology program to succeed: 1. availability of trained personnel to operate the device; 2. availability of experienced personnel to determine whether the acquired image is suitable for grading; 3. necessary training to ensure that the operator can adjust device settings and environmental conditions to repeat image acquisitions for improved image quality.

Existing approaches for image quality assessment evaluate images based on features, in an ad-hoc manner and does not generalize or adapt well to new scenarios. Those existing approaches also do not consider the working of the human visual system for determining image quality. The system and method of the present disclosure in one embodiment takes a principled approach to image quality assessment by developing in one embodiment algorithms that imitate the working of the human visual system (HVS).

Quality assessment may be viewed as subjective as it depends on what a user perceives as a good quality image, and thus may call for solving the problem from a novel neurobiological perspective. The system and method of the present disclosure in one embodiment explores the working of the HVS to determine image quality. The HVS works by multi-scale analysis of low level feature maps, and a neurobiology based image quality assessment (IQA) algorithm is expected to reach performance levels close to the human grader. The system and method of the present disclosure in one embodiment addresses the problem of IQA using models of the HVS. A local saliency map of the present disclosure in one embodiment calculates saliency values for every image pixel, and by using different scales, the system and/or method of the present disclosure in one embodiment captures local and global image information that is relevant for IQA. In one embodiment, the output responses of the filters are used as input to a classifier that identifies images that are ungradable and require a second scanning.

Humans rely on the human visual system (HVS) to identify poor quality images. IQA is subjective as it depends on what a user perceives as a good quality image. The system and/or method of the present disclosure in one embodiment may minimize subjectivity and bias of existing algorithms. The system and/or method of the present disclosure in one embodiment is based on using the underlying neurobiological principles behind the working of the HVS. In the present disclosure in one embodiment, local saliency map calculates saliency values for every image pixel, and captures local and global image information that is relevant for IQA. The system and/or method of the present disclosure may train a convolutional neural network (CNN) to learn the feature representations from training data and leverage the learned information for IQA. The system and/or method of the present disclosure in one embodiment combines supervised (trained CNNs) and unsupervised (local saliency maps) models using Random forest (RF) classifier to obtain higher classification accuracy and minimize possible bias.

Generally in known systems, it may be left up to the operator to identify the necessary adjustments needed to acquire an improved image, which may not be always possible in a telemedicine context. For instance, there may be no automatic feedback mechanism on the possible reasons for poor image quality and what kind of information (generic or structural) could not be reliably extracted. The system and/or method of the present disclosure in one embodiment is able to identify ungradable images and also the factors that make the image ungradable. The system and/or method of the present disclosure in one embodiment may automatically provide suggestions on what steps the operator can take to improve image quality. This decreases the number of instances an operator needs to acquire gradable images and improves the system's cost-effectiveness.

Current systems also rely on operators' expertise to take subsequent action to improve the quality of follow up images. However, not all operators may have the necessary expertise levels to adjust device settings to improve the quality of follow up images. The system and/or method of the present disclosure in one embodiment may apply automatic algorithms to improve the image quality, e.g., in case the operator lacks the required expertise. The choice of algorithm may depend upon the output of the previous step which has identified the reason for poor image quality. This facility may be also relevant in a scenario where the images are acquired by the patient using mobile devices. Novice operators will find it difficult to change device settings to improve quality of acquired images. However, with the use of the system and/or method of the present disclosure in one embodiment can improve image quality without user intervention for choosing the most relevant methods for image quality improvement. The system and/or method of the present disclosure in one embodiment provides an improvement to automated screening system that aims to minimize human intervention in clinical decision.

The system and/or method of the present disclosure in one embodiment also may address lack of principled approach behind image processing algorithms. Although generic image features are easy to calculate, they are insufficient to make a reliable decision for difficult cases as the features provide very little high level information. Additionally, a number of different feature maps are calculated without a clear understanding of which are beneficial for the human observer in making a decision. Structural image parameters, while providing more information require complex algorithms for landmark identification and segmentation. Any errors in landmark detection algorithms adversely affects the final assessment. Moreover it is not clear which landmarks are best suited for the specific task since different use cases would emphasize on different retinal landmarks. These limitations can be overcome, e.g., by using models of the human visual system such that the extracted features combine the information obtained from the above two sets of methods, and at the same time are not dependent on arbitrarily identified features or landmarks for quality assessment.

The system and/or method of the present disclosure in one embodiment provides an approach for local saliency map calculation that imitates the working of the human visual system (HVS). In one embodiment, this information from the working of the HVS may be used in making a decision on the image's gradability. Local saliency maps in one embodiment of the present disclosure incorporate principles behind the working of the human visual system. The system and/or method of the present disclosure in one embodiment may also leverage semantic knowledge from trained CNNs to assist in image quality determination; and identify possible causes in poor image acquisition and use automated methods to correct these errors.

Figure 7:
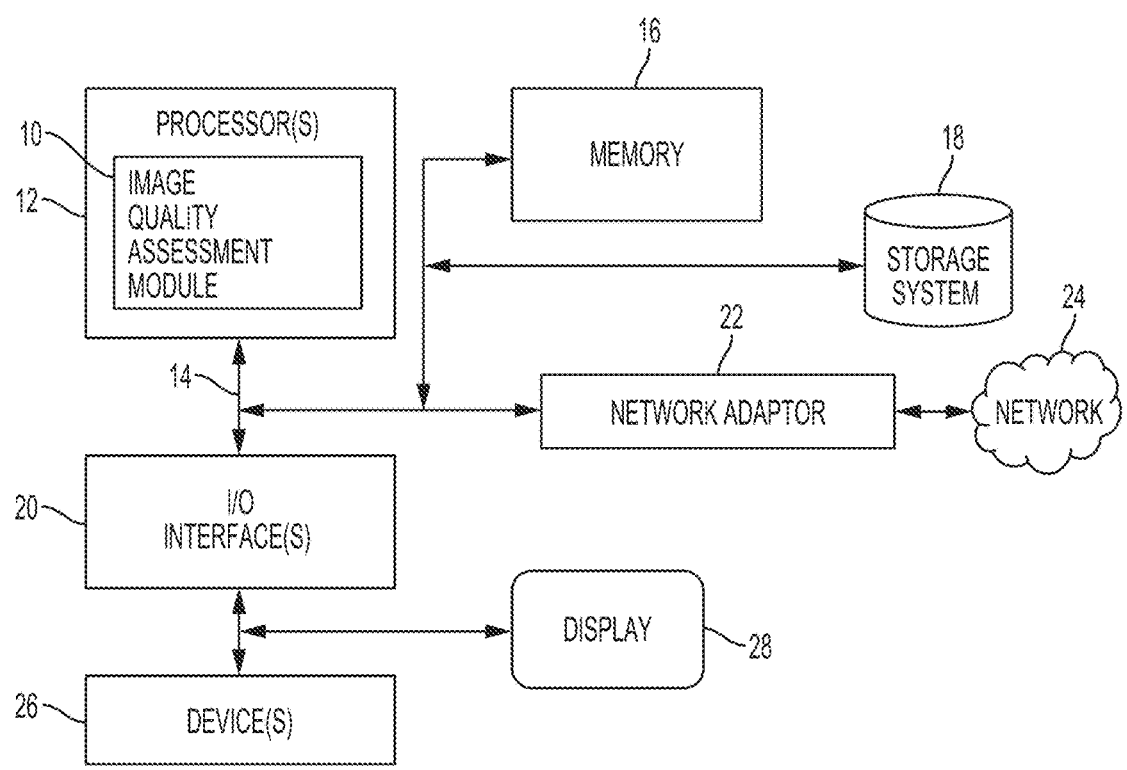
FIG. 7 illustrates a schematic of an example computer or processing system that may implement an image quality assessment system in one embodiment of the present disclosure.

FIG. 7 illustrates a schematic of an example computer or processing system that may implement an image quality assessment system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of determining image quality, the method performed by one or more processors, the method comprising:
    receiving an image generated by a machine;
    generating a local saliency map of the image to obtain a set of unsupervised features using unsupervised learning;
    inputting the image through a trained convolutional neural network (CNN) to extract a set of supervised features from a fully connected layer of the CNN using supervised learning, the image convolved with a set of learned kernels from the CNN to obtain a complementary set of supervised features;
    combining the set of unsupervised features, the set of supervised features and the complementary set of supervised features;
    predicting a first decision on gradability of the image with a first confidence score, by training a first classifier based on a combined set of unsupervised features, the set of supervised features and the complementary set of supervised features;
    predicting a second decision on gradability of the image with a second confidence score, by training a second classifier based on the set of supervised features; and
    determining whether the image is gradable or ungradable based on a weighted combination of the first decision and the second decision, the first confidence score and the second confidence score representing respective weights for the first decision and the second decision.

2. The method of claim 1, further comprising automatically correcting the machine to generate a gradable image responsive to determining the image is ungradable.

3. The method of claim 1, further comprising preprocessing the image by normalizing the intensity values of image pixels and resizing the normalized intensity image to a resized image of a defined pixel size, wherein the local saliency map is generated from the resized image.

4. The method of claim 1, wherein the local saliency map is generated using one or more models of a human visual system.

5. The method of claim 1, wherein the generating of the local saliency map comprises:
    converting the image into a grayscale intensity image;
    generating texture image and curvature image based on the grayscale intensity image;
    generating multi-scale saliency maps at a plurality of different scales based on the grayscale intensity image, the texture image and the curvature map, wherein a saliency value is computed for every pixel, the multi-scale saliency maps capturing local and global information of the image;
    determining mean pixel values of sub-blocks of the multi-scale saliency maps; and
    combining the mean pixel values to obtain a single feature vector to represent the local saliency map.

6. The method of claim 1, further comprising training the CNN.

7. The method of claim 1, wherein the first classifier and the second classifier comprise a random forest classifier that predicts the label of the image.

8. A computer readable storage medium storing a program of instructions executable by a machine to perform a method of determining image quality, the method comprising:
    receiving an image generated by a machine;
    generating a local saliency map of the image to obtain a set of unsupervised features using unsupervised learning;
    inputting the image through a trained convolutional neural network (CNN) to extract a set of supervised features from a fully connected layer of the CNN using supervised learning, the image convolved with a set of learned kernels from the CNN to obtain a complementary set of supervised features;
    combining the set of unsupervised features and the complementary set of supervised features;
    predicting a first decision on gradability of the image with a first confidence score, by training a first classifier based on a combined set of unsupervised features and the complementary set of supervised features;

predicting a second decision on gradability of the image with a second confidence score, by training a second classifier based on the set of supervised features; and determining whether the image is gradable or ungradable based on a weighted combination of the first decision and the second decision, the first confidence score and the second confidence score representing respective weights for the first decision and the second decision.

9. The computer readable storage medium of claim 8, further comprising automatically correcting the machine to generate a gradable image responsive to determining the image is ungradable.

10. The computer readable storage medium of claim 8, further comprising preprocessing the image by normalizing the intensity values of image pixels and resizing the normalized intensity image to a resized image of a defined pixel size, wherein the local saliency map is generated from the resized image.

11. The computer readable storage medium of claim 8, wherein the local saliency map is generated using one or more models of a human visual system.

12. The computer readable storage medium of claim 8, wherein the generating of the local saliency map comprises:
converting the image into a grayscale intensity image;
generating texture image and curvature image based on the grayscale intensity image;
generating multi-scale saliency maps at a plurality of different scales based on the grayscale intensity image, the texture image and the curvature map, wherein a saliency value is computed for every pixel, the multi-scale saliency maps capturing local and global information of the image;
determining mean pixel values of sub-blocks of the multi-scale saliency maps; and
combining the mean pixel values to obtain a single feature vector to represent the local saliency map.

13. The computer readable storage medium of claim 8, further comprising training the CNN.

14. The computer readable storage medium of claim 8, wherein the first classifier and the second classifier comprise a random forest classifier that predicts the label of the image.

15. The computer readable storage medium of claim 8, wherein the image includes an 8-bit color fundus image spanning an intensity range of 0-255, wherein the image is macula centered.

16. A system of determining image quality, comprising:
one or more hardware processors operable to receive an image generated by a machine,
one or more of the hardware processors further operable to generate a local saliency map of the image to obtain a set of unsupervised features using unsupervised learning,
one or more of the hardware processors further operable to input the image through a trained convolutional neural network (CNN) to extract a set of supervised features from a fully connected layer of the CNN using supervised learning, the image convolved with a set of learned kernels from the CNN to obtain a complementary set of supervised features,
one or more of the hardware processors further operable to combine the set of unsupervised features and the complementary set of supervised features,
one or more of the hardware processors further operable to predict a first decision on gradability of the image with a first confidence score, by training a first classifier based on a combined set of unsupervised features and the complementary set of supervised features,
one or more of the hardware processors further operable to predict a second decision on gradability of the image with a second confidence score, by training a second classifier based on the set of supervised features,
one or more of the hardware processors further operable to determine whether the image is gradable or ungradable based on a weighted combination of the first decision and the second decision, the first confidence score and the second confidence score representing respective weights for the first decision and the second decision.

17. The system of claim 16, wherein one or more of the hardware processors further operable to automatically correct the machine to generate a gradable image responsive to determining the image is ungradable.

18. The system of claim 16, wherein one or more of the hardware processors further operable to preprocess the image by normalizing the intensity values of image pixels and resizing the normalized intensity image to a resized image of a defined pixel size, wherein the local saliency map is generated from the resized image.

19. The system of claim 16, wherein to generate the local saliency map, one or more of the hardware processors operable to convert the image into a grayscale intensity image, one or more of the hardware processors further operable to generate texture image and curvature image based on the grayscale intensity image, one or more of the hardware processors further operable to generate multi-scale saliency maps at a plurality of different scales based on the grayscale intensity image, the texture image and the curvature map, wherein a saliency value is computed for every pixel, the multi-scale saliency maps capturing local and global information of the image, one or more of the hardware processors further operable to determine mean pixel values of sub-blocks of the multi-scale saliency maps, and one or more of the hardware processors further operable to combine the mean pixel values to obtain a single feature vector to represent the local saliency map.

20. The system of claim 1, wherein the first classifier and the second classifier comprise a random forest classifier that predicts the label of the image.

* * * * *